(12) United States Patent
Mosher et al.

(10) Patent No.: US 9,150,078 B2
(45) Date of Patent: Oct. 6, 2015

(54) VEHICLE SUSPENSION APPARATUS WITH BAR AND BODY LOAD REACTION COMPONENT FOR RIDE HEIGHT MANAGEMENT

(71) Applicant: GM GLOBAL TECHNOLOGY OPERATIONS LLC, Detroit, MI (US)

(72) Inventors: Jeffrey A. Mosher, Farmington Hills, MI (US); Scott A. Kolp, Clarkston, MI (US); Robert G. Izak, Dryden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 14/057,015

(22) Filed: Oct. 18, 2013

(65) Prior Publication Data

US 2015/0108726 A1    Apr. 23, 2015

(51) Int. Cl.
*B60G 17/005* (2006.01)
*B60G 21/05* (2006.01)
*B60G 21/02* (2006.01)

(52) U.S. Cl.
CPC .............. *B60G 21/05* (2013.01); *B60G 21/023* (2013.01); *B60G 21/026* (2013.01)

(58) Field of Classification Search
USPC .................... 280/124.134, 124.137, 124.145, 280/124.149, 5.507
See application file for complete search history.

(56) References Cited

U.S. PATENT DOCUMENTS

| 7,628,414 | B2 * | 12/2009 | Dobson et al. .......... 280/124.106 |
| 7,717,437 | B2 * | 5/2010 | Adams et al. ............. 280/5.508 |
| 7,837,202 | B2 * | 11/2010 | Taneda et al. ............. 280/5.511 |
| 7,992,280 | B2 * | 8/2011 | Fader et al. ................ 29/527.1 |
| 8,033,556 | B2 * | 10/2011 | Ohra-aho et al. ...... 280/124.106 |
| 2006/0049601 | A1 * | 3/2006 | Matsumoto ............ 280/124.106 |
| 2007/0007742 | A1 * | 1/2007 | Allen et al. ............. 280/124.134 |
| 2007/0085295 | A1 * | 4/2007 | Johnson et al. ........ 280/124.152 |
| 2009/0026724 | A1 * | 1/2009 | Hirai ....................... 280/124.134 |

* cited by examiner

*Primary Examiner* — Toan To
(74) *Attorney, Agent, or Firm* — Quinn Law Group, PLLC

(57) ABSTRACT

A suspension apparatus for a vehicle includes a bar operatively connectable to driver-side and passenger-side suspension corner assemblies to extend therebetween and rotatably mountable to the vehicle body between the suspension corner assemblies. The suspension apparatus also includes a body load reaction component that is operatively connectable to at least one of the body and the bar. The body load reaction component is engaged to provide reaction force on the body to manage vertical displacement of the body.

20 Claims, 4 Drawing Sheets

US 9,150,078 B2

VEHICLE SUSPENSION APPARATUS WITH BAR AND BODY LOAD REACTION COMPONENT FOR RIDE HEIGHT MANAGEMENT

TECHNICAL FIELD

The present teachings generally include a suspension apparatus for a vehicle that includes a body load reaction component configured to provide reaction force between a bar attached to suspension components and a vehicle body.

BACKGROUND

Vehicle suspension systems are designed to manage the transmission of road forces to the vehicle body, manage vehicle ride height, and tire lateral load transfer distribution (i.e., a slight shift of the sprung mass about a longitudinal axis that may occur during relatively fast cornering). Each of these functions is managed by different components of the suspension system to meet handling and comfort objectives.

SUMMARY

A suspension apparatus for a vehicle includes a bar operatively connectable to driver-side and passenger-side suspension corner assemblies to extend therebetween and rotatably mountable to the vehicle body between the suspension corner assemblies. The suspension apparatus also includes a body load reaction component that is operatively connectable to at least one of the body or the bar for movement therewith. The body load reaction component can be a nonlinear spring bumper, such as a jounce bumper or any other suitable resilient bumper, or can be an actively controlled body load reaction component, such as a force actuator. The body load reaction component is configured to engage to react body load forces when the bar rotates sufficiently relative to the body. The body load reaction component manages vertical displacement of the body. As used herein, the body load reaction component is "engaged" in an embodiment with a passive body load reaction component (not actively controlled) when the body load reaction component is compressed. For a body load reaction component that is actively controlled, the body load reaction component is "engaged" when the body load reaction component is actuated to provide a reaction force. For example, a sufficient downward force on the body rotates the bar relative to the body to cause the body load reaction component to react against the bar. Moreover, sufficient relative movement of both suspension corner assemblies upward relative to the body may rotate the bar relative to the body to cause the body load reaction component to react against the bar. The bar and body load reaction component together thus help to manage changes in the ride height of the vehicle by resisting vertical movement of the vehicle body.

Each of the corner assemblies may have a corner jounce bumper. In such embodiments, the bar and the body load reaction component are configured so that the body load reaction component is engaged to react downward body force prior to compression of the corner jounce bumpers when the bar rotates relative to the body under the sufficient downward force on the body. Additionally, the bar and the body load reaction component can be configured so that the body load reaction component is compressed by a center portion of the bar. This orientation of the body load reaction component relative to the bar enables the body load reaction component to avoid loading by the bar when the bar twists as ends of the bar move in opposite directions, such as during a single wheel travel event, and to avoid loading by the bar during vehicle cornering. Thus, the added body load reaction component need not affect the spring rate applied by either one of the corner suspension assemblies in individual wheel travel events.

In one embodiment, the body load reaction component is mounted to the vehicle body, and the bar has a nonlinear center portion between mount locations on the vehicle body. The nonlinear center portion is configured to transfer body loading to the body load reaction component when the bar rotates. The nonlinear center portion includes bent portions with a straight portion between the bent portions. In another embodiment, the nonlinear center portion has a straight portion with an extension extending therefrom. In that embodiment, the body load reaction component is mounted to the extension portion of the bar. In still another embodiment, a second body load reaction component is operatively connectable to at least one of the body and the bar for movement therewith. The second body load reaction component is configured to engage when the bar rotates sufficiently relative to the body in a direction opposite to a direction of rotation of the bar that engages the first body load reaction component. The second body load reaction component thus acts as a rebound bumper.

In any of the various embodiments, ride height can also be actively varied by adjusting the position of the body load reaction component relative to the bar. For example, the body load reaction component may be a force actuator. The actuator can be operatively mountable to the vehicle body. A controller may be operatively connected to the actuator and configured to activate the actuator to react body forces to actively control ride height. Static control of ride height can be achieved by selection of the position or height of the body load reaction component.

The above features and advantages and other features and advantages of the present teachings are readily apparent from the following detailed description of the best modes for carrying out the present teachings when taken in connection with the accompanying drawings.

DETAILED DESCRIPTION

Figure 1:
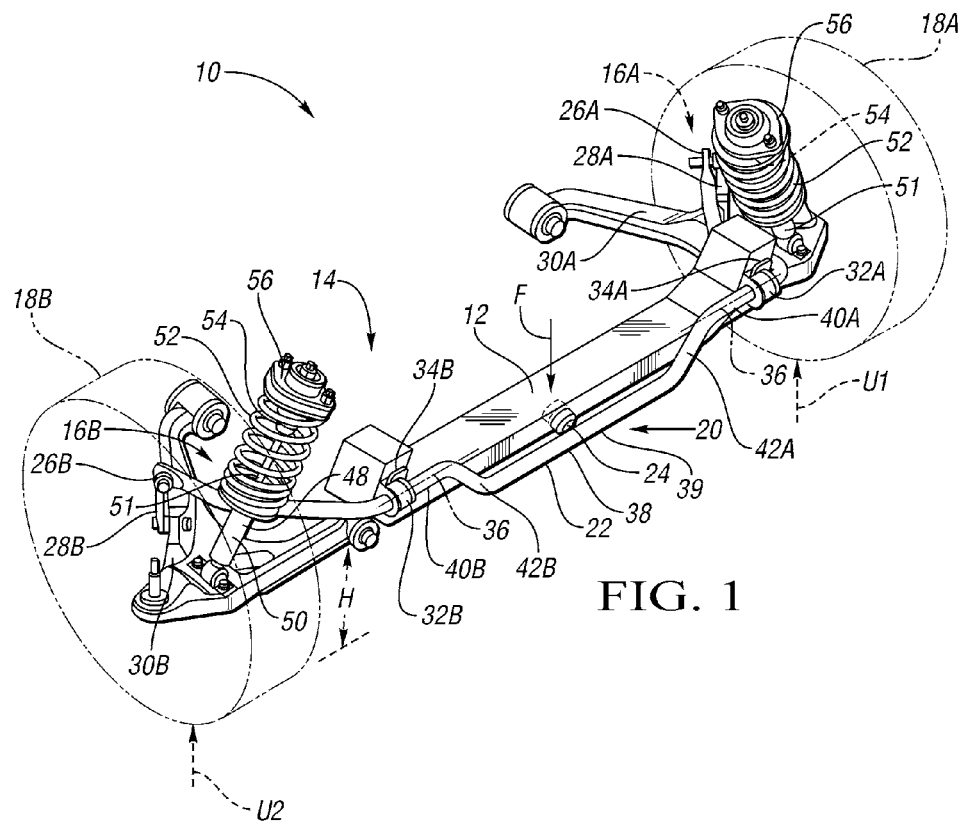
FIG. 1 is a schematic perspective illustration of a portion of a first embodiment of a vehicle with a first embodiment of a suspension system having a first embodiment of a suspension apparatus.

Referring to the drawings, wherein like reference numbers refer to like components throughout the views, FIG. 1 shows a portion of a vehicle 10 that includes a vehicle body 12 and a suspension system 14. The vehicle body 12 is shown as a portion of a subframe. As used herein, "vehicle body" can be any component of the sprung mass of the vehicle 10, including a body member, a frame member, a subframe member, or any load-bearing component supported by the suspension system 14.

The suspension system 14 shown is a front suspension system and includes a driver-side suspension corner assembly 16A and a passenger-side corner suspension assembly 16B. The suspension corner assemblies 16A, 16B include components connecting the body 12 and the vehicle steering system (not shown) to a driver-side tire and wheel assembly 18A and a passenger-side tire and wheel assembly 18B, respectively, both of which are indicated in phantom. Each suspension corner assembly 16A, 16B is configured to provide damping between the unsprung mass of the vehicle 10 and the road load forces acting on the respective tire and wheel assemblies 18A, 18B, as is understood by those skilled in the art.

The suspension system 14 also includes a suspension apparatus 20 with a bar 22 and a body load reaction component 24. The bar 22 has first and second ends 26A, 26B. The first end 26A is operatively connected to the suspension corner assembly 16A, and the second end 26B is operatively connected to the suspension corner assembly 16B. More specifically, the ends 26A, 26B are connected via end links 28A, 28B to lower control arms 30A, 30B. The bar 22 thus extends laterally between the suspension corner assemblies 16A, 16B. This enables the bar 22 to provide tire lateral load distribution during lateral acceleration such as may occur when cornering.

First and second mounting features 32A, 32B, such as bushings, are fixed to the body 12 at first and second mount locations 34A, 34B that are laterally between the suspension corner assemblies 16A, 16B. The bar 22 is rotatable about an axis 36 at the mount locations 34A, 34B. The body load reaction component 24 is mounted to the body 12 for movement therewith. In other words, one end of the body load reaction component 24 is secured to the body 12. In the embodiment shown, the body load reaction component 24 is a nonlinear bumper, such as a spring bumper, that provides a nonlinear spring rate when compressed. The body load reaction component 24 can also be referred to as a spring bumper, jounce bumper, or a bump stop.

Figure 2:
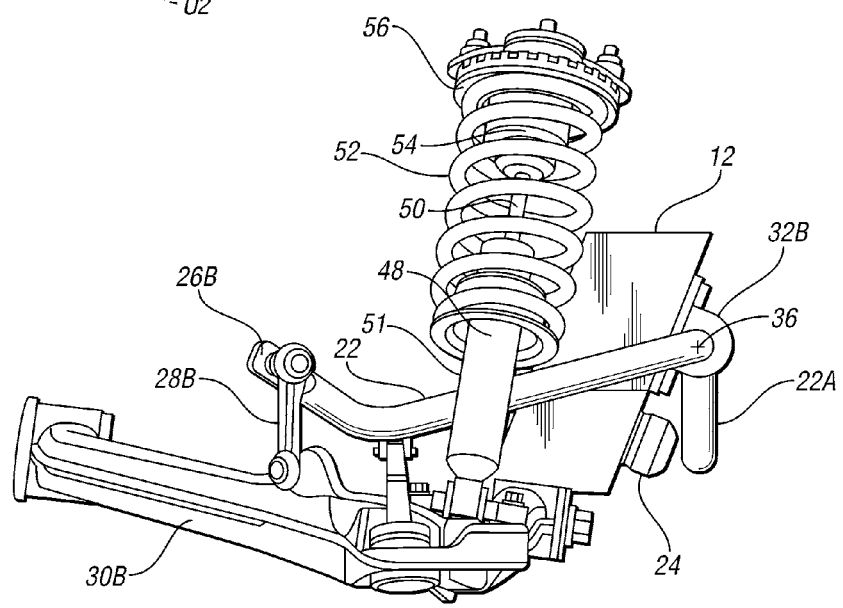
FIG. 2 is a schematic side view illustration of a portion of the suspension system of FIG. 1 showing a bar mounted to the vehicle body and spaced from a first embodiment of a body load reaction component that is a spring bumper mounted to the vehicle body.
Figure 3:
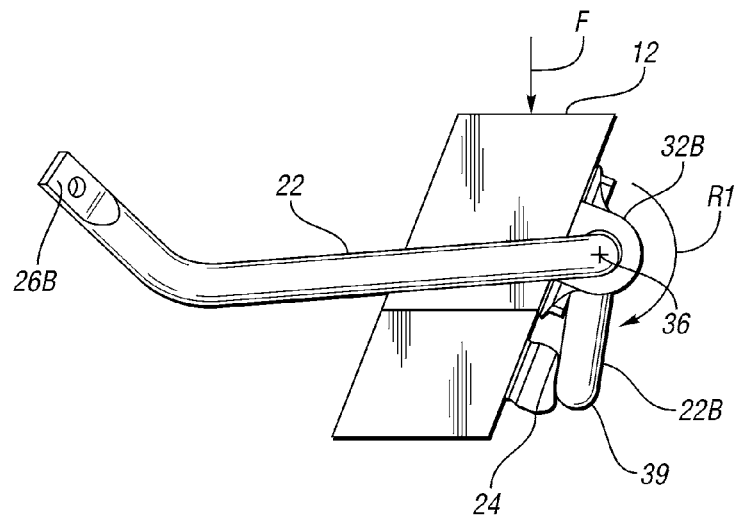
FIG. 3 is a schematic side view illustration of a portion of the suspension system of FIGS. 1 and 2 showing the bar rotating to compress the body load reaction component.

The bar 22 is configured to compress the body load reaction component 24 between the bar 22 and the body 12 when the bar 22 rotates sufficiently relative to the body 12. Compression of the body load reaction component 24 constrains further vertical displacement of the body 12 and absorbs at least some of the energy of the bar 22 and the body 12. For example, when a downward force F, shown in FIG. 3, is applied to the body 12, such as due to an increased load in the vehicle 10 or a downward aerodynamic force on the vehicle 10, the bar 22 will rotate relative to the body 12 in a direction of rotation R1 about an axis 36 that extends through the mounting features 32A, 32B. For example, the bar rotates from a first position 22A shown in FIG. 2 to a second position 22B shown in FIG. 3. The bar 22 rotates because it is pushed downward at the mount locations 34A, 34B relative to its ends 26A, 26B. When the bar 22 is in the first position 22A, the body load reaction component 24 is spaced from (i.e., free from contact with) the bar 22.

A center portion 38 of the bar 22 extends from two relatively straight portions 40A, 40B at the mount locations 34A, 34B and includes two bends 42A, 42B between the straight portions 40A, 40B and a relatively straight interfacing portion 39 configured to compress the body load reaction component 24. Due to this shape, the bar 22 is referred to as a "Y" bar. When the bar 22 rotates relative to the body 12, the center portion 24 thus acts like a lever to compress the body load reaction component 24. The bar 22 and the body load reaction component 24 are configured so that compression occurs under a force F of greater than or equal to a predetermined magnitude. Motion of tire and wheel assemblies 18A, 18B together relative to the body 12 will also cause the bar 22 to rotate to compress the body load reaction component 24 in the same manner. For example, substantially equal forces U1, U2 acting upward on the tire and wheel assemblies 18A, 18B (as indicated in FIG. 1) will cause the rotational motion of the bar 22.

Each suspension corner assembly 16A, 16B includes, respectively, a shock absorber 48, with a strut 50 moving in a strut housing 51, a coil spring 52, and a corner jounce bumper 54 at an upper mount side 56 of the spring 52. In FIGS. 1 and 2, a dust cover 58, shown on the suspension corner assemblies 16A, 16B of FIGS. 5-6 and 8-9, is removed from each suspension corner assembly 16A, 16B so that the corner jounce bumpers 54 will be partially visible. The corner jounce bumper 54 of the corner suspension assembly 16A is substantially identical to the corner jounce bumper 54 of the corner suspension assembly 16B. A downward force F on the body 12 of at least the predetermined magnitude, or sufficiently large upward forces U1, U2 on the tire and wheel assemblies 18A, 18B, will cause sufficient rotation on the bar 22 in the direction R1 to engage the body load reaction component 24. If the downward force F or the upward forces U1, U2 are large enough (i.e., some predetermined magnitude larger than the predetermined magnitude that causes engagement of the body load reaction component 24), compression of the corner jounce bumpers 54 will also occur after the body load reaction component 24 is compressed (i.e., engaged). The bar 22 interacting with the body load reaction component 24 in this manner enables the spring rate of the body load reaction component 24 to be selected to provide consistent tire lateral load transfer distribution while allowing relatively soft corner suspension assemblies 16A, 16B to be used, if desired.

Accordingly the bar 22 "rotates" as there is movement of the entire bar 22 about the axis 36 at both mounting locations 34A, 34B. The addition of the body load reaction component 24 in combination with the bar 22 and its center portion 38 configured to compress the body load reaction component 24 thus enables the body load reaction component 24 to affect changes in ride height H (the relative vertical position of a predetermined portion of the body 12 (such as the underside of the body 12) to a lowest extent of both tire and wheel assemblies 18A, 18B).

Figure 4:
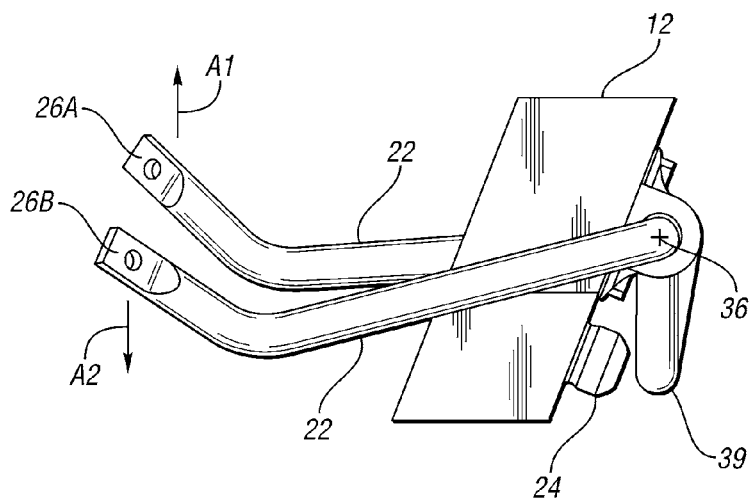
FIG. 4 is a schematic side view illustration of a portion of the suspension system of FIGS. 1-3 showing the bar twisting and remaining spaced from the spring bumper.

Conversely, "twisting" of the bar 22 is relative motion between the two ends 26A, 26B, as can occur in a single wheel event when one tire and wheel assembly 18A, 18B moves in a vertical direction relative to the other tire and wheel assembly 18A, 18B. In FIG. 4, the first end 26A is shown moving upward by arrow A1, and the second end 26B is shown moving downward by arrow A2, indicating the relative motion of the tire and wheel assembly 18A upward. As illustrated in FIG. 4, single wheel events causing twist of the bar 22 will not cause the bar 22 to compress the body load reaction component 24, or will at most cause minimal compression of the body load reaction component 24. In other words, the body load reaction component 24 will be free from contact with the bar 22, or will have minimal contact with the bar 22 with only minimal compression, depending on the size of the body load reaction component 24. This is because, in a single wheel event, only a fraction of the amount of vertical motion at a single one of the tire and wheel assemblies 18A, 18B is experienced at the center portion 38 of the bar 22. Instead, the spring rate of the suspension corner assembly 16A or 16B at the tire and wheel assembly 18A or 18B involved in the single wheel event will affect movement of the single tire and wheel assembly. Accordingly, the suspension apparatus 20 having the bar 22 and body load reaction component 24 as described enables a spring rate of the body load reaction component 24 to be a nonlinear spring rate to control ride height. The spring rate of the corner suspension assemblies 16A, 16B can be different than the spring rate of the body load reaction component 24, and need not be configured to impact ride height; the corner suspension assemblies 16A, 16B can therefore be configured with potentially softer and more pleasing spring rates for single wheel events.

The bar 22 and body load reaction component 24 are configured so that a slight shifting of the sprung mass about a longitudinal axis, such as in vehicle cornering, will cause no compression of the body load reaction component 24. During a cornering event, the sprung mass of the vehicle 10 may shift slightly about a longitudinal axis (not shown, but perpendicular to the axis 36), causing one tire and wheel assembly 16A or 16B to move away from the vehicle body 12 by a substantially equal amount as the other tire and wheel assembly 16A or 16B moves closer to the vehicle body 12, with no displacement of the center portion 38 relative to the vehicle body 12.

Figure 5:
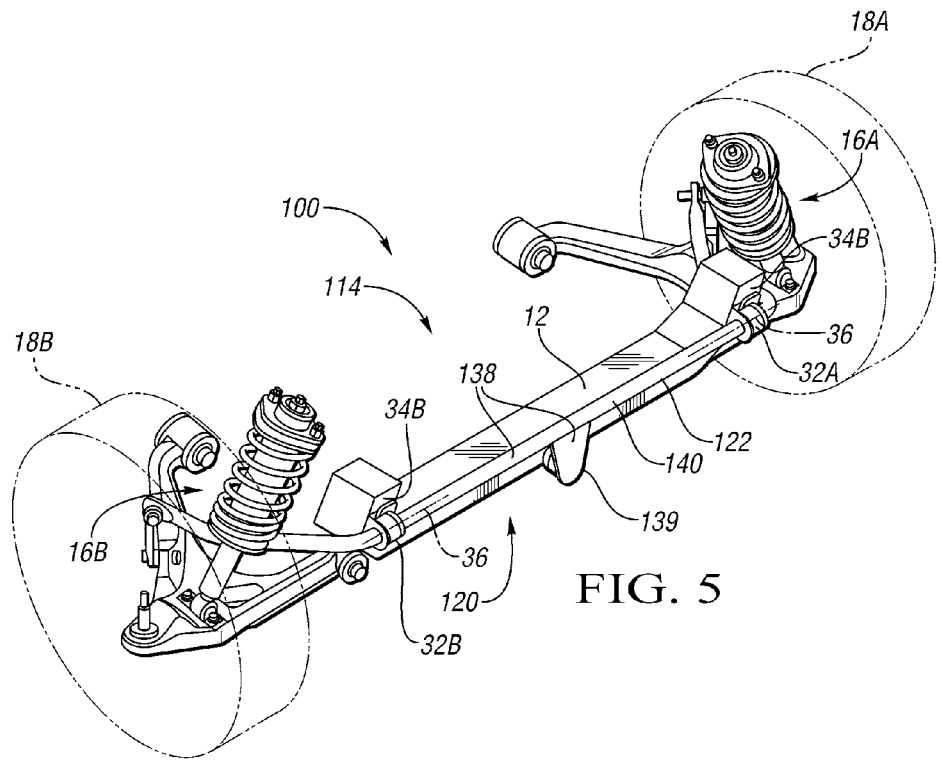
FIG. 5 is a schematic perspective illustration of a portion of a second embodiment of a vehicle with a second embodiment of a suspension system having a second embodiment of a suspension apparatus.
Figure 6:
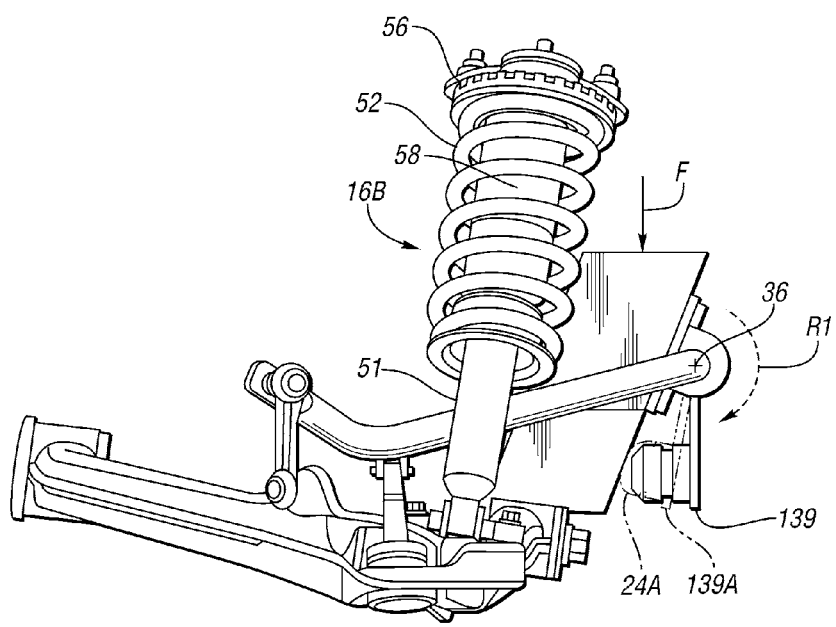
FIG. 6 is a schematic side view illustration of the suspension system of FIG. 5 showing a bar mounted to the vehicle body and having a second embodiment of a body load reaction component, which is a spring bumper mounted to the bar and spaced from the vehicle body, and shown in phantom compressed into the body when the bar rotates relative to the body.

FIGS. 5 and 6 show a vehicle 100 with another embodiment of a suspension system 114 and suspension apparatus 120. Identical reference numbers are used for components that are identical to those described with respect to the embodiment of FIGS. 1-4, and the description of such components with respect to FIGS. 1-4 applies to the same components in FIGS. 5-6. The suspension apparatus 120 includes a bar 122. The bar 122 has a nonlinear center portion 138 between the mounting features 32A, 32B. The nonlinear center portion 138 includes a straight portion 140 that has an extension portion 139 extending downward from the straight portion 140. Due to this shape, the bar 122 may be referred to as a "Y" bar. The body load reaction component 24 is mounted to the extension portion 139 of the bar 122. When downward force F is applied to the body 12 so that the bar 122 rotates as indicated in phantom with arrow R1 in FIG. 6, the extension portion 139 moves to a rotated position 139A, thereby moving the body load reaction component 24 to a compressed position 24A in which the body load reaction component 24 is compressed between the extension portion 139 and the body 12. With the placement of the body load reaction component 24 at a center portion 138 of the bar 122, the suspension apparatus 120 is also configured so that there is minimal or no compression of the body load reaction component 24 during single wheel events or during vehicle cornering, as discussed with respect to FIGS. 1-4.

Figure 7:
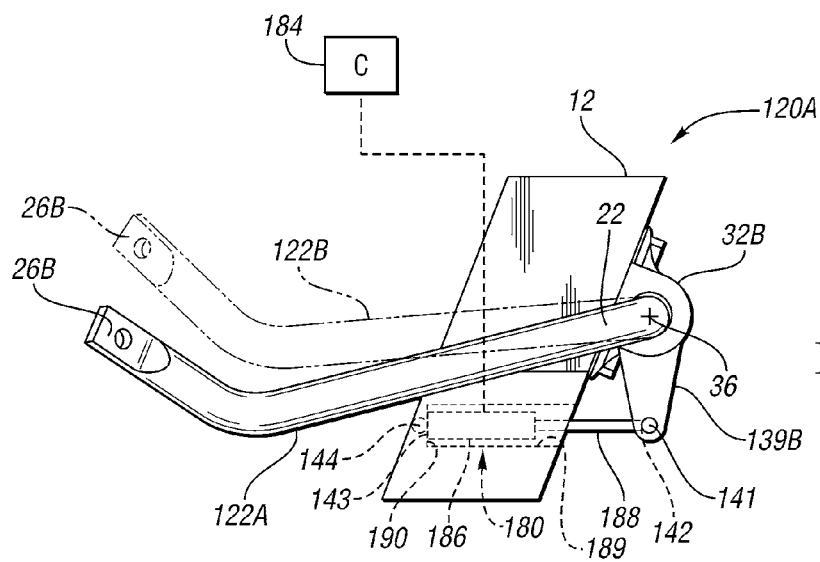
FIG. 7 is a schematic side view illustration of a portion of a third embodiment of a suspension system having a suspension apparatus with a third embodiment of a body load reaction component that is an actively controlled actuator, showing the bar moved to a second position shown in phantom relative to the vehicle body.

FIG. 7 shows a suspension apparatus 120A that has a bar 122A identical to the bar 122 of FIGS. 5 and 6 except that an extension portion 139B extending from the straight portion 140 is configured to pivotably mount at pivot connection 141 to one end 142 of a force actuator 180. The bar 122A can be referred to as a "Y-bar". The force actuator 180 is a body load reaction component and has another end 143 pivotably mounted to the vehicle body 12 at pivot connection 144. The body 12 has a cavity 189 that houses the actuator 180, and the pivot connection 144 is at a wall 190 of the body 12 at an end of the cavity 189.

The actuator 180 is configured to be activated by any suitable means, such as hydraulically or electrically under the control of a controller (C) 184. For example, the amount of rotation (if any) of the bar 122A about the axis 36, such as to a second position 122B shown in phantom due to downward forces on the vehicle body 12, and the associated change in ride height of the vehicle body 12, is controlled by the reaction force provided by the actuator 180. The actuator 180 has a body 186 and an extendable piston 188 controllably linearly movable relative to the body 186. In an embodiment in which the actuator 180 is a hydraulic actuator and is hydraulically activated, the body 186 has an internal hydraulic chamber and the controller 184 controls hydraulic pressure in the chamber to control movement of the bar 122A, similar to a controllable hydraulic strut. In an embodiment in which the force actuator 180 is electrically activated, the body 186 may include an electric solenoid or an electric motor that moves the piston 188 when electrical energy is provided from a battery (not shown) under the control of the controller 184. Those skilled in the art will readily understand various suitable controllable actuators. Actuation of the actuator 180 in this manner is referred to as engagement of the actuator 180. The actuator 180 thus enables active control of vehicle ride height. Although only one side of the bar 122A near end 26B is shown in FIG. 7, the other side of the bar near end 26A moves to a similar position as the side near end 26B when the actuator 180 is activated, and the bar 122A does not twist.

Figure 8:
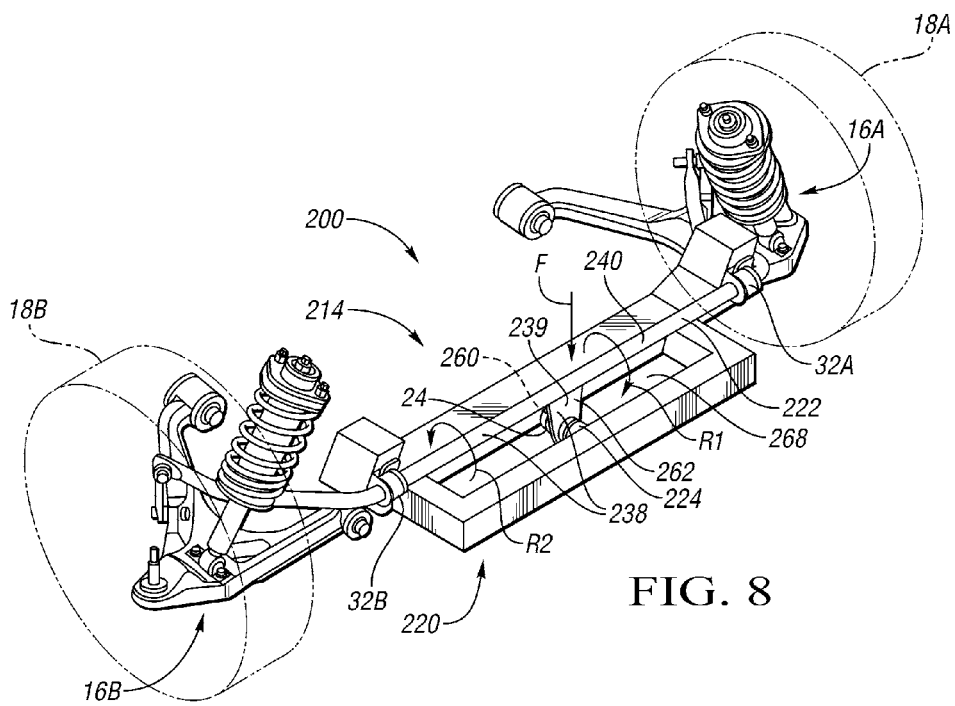
FIG. 8 is a schematic perspective illustration of a portion of a fourth embodiment of a vehicle with a fourth embodiment of a suspension system having a fourth embodiment of a suspension apparatus.
Figure 9:
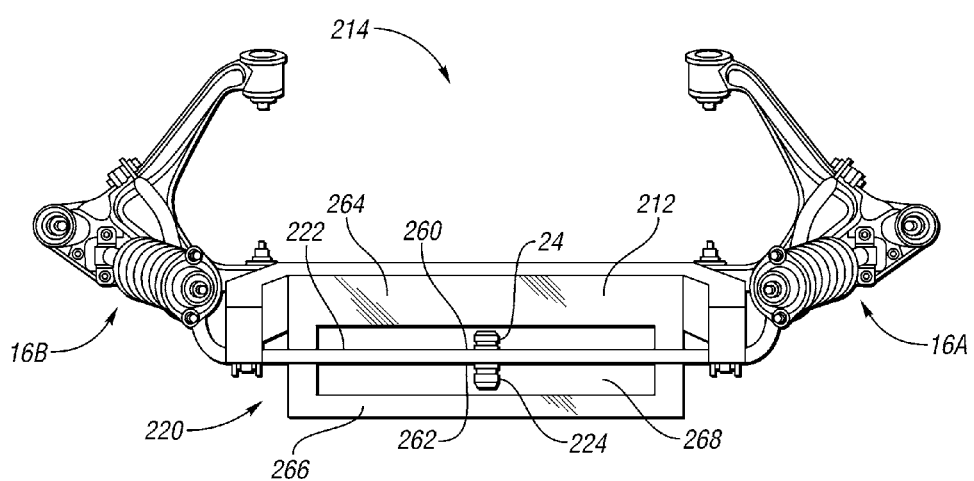
FIG. 9 is a schematic illustration in plan view of the suspension system of FIG. 8.

FIGS. 8 and 9 show a vehicle 200 with another embodiment of a suspension system 214 and a suspension apparatus 220. Identical reference numbers are used for components that are identical to those described with respect to the embodiment of FIGS. 1-4, and the description of such components with respect to FIGS. 1-4 applies to the same components in FIGS. 8-9. The suspension apparatus 220 includes a bar 222. The bar 222 has a nonlinear center portion 238 between the mounting features 32A, 32B. The nonlinear center portion 238 includes a straight portion 240 that has an extension portion 239 extending downward from the straight portion 240. A first body load reaction component 24 is mounted to a first side 260 of the extension portion 239 of the bar 222. The first side 260 faces generally rearward in the vehicle 200 when the bar 222 is in the first position shown in FIG. 8. A second body load reaction component 224 is mounted to a second side 262 of the extension portion 239 of the bar 222. The second side 262 faces generally forward in the vehicle 200 when the bar 222 is in the position shown in FIG. 8. In the embodiment shown, both of the first and second body load reaction components 24, 224 are nonlinear spring bumpers. In other embodiments, either or both of the body load reaction components 24, 224 could be a spring bumper, including a nonlinear spring bumper, a bump stop, or an actively controlled force actuator.

A vehicle body 212 is arranged with a portion 264 rearward of the first body load reaction component 24, similar to the body 12 in FIG. 5. The body 212 also has a portion 266 positioned generally forward of the second body load reaction component 224. In FIGS. 8 and 9, the body 212 is shown as a unitary component that forms a cavity 268. The bar 222 is configured so that the extension portion 239 with bumpers 24, 224 is positioned in the cavity 268. The body 212 is not limited to this configuration, and may be configured in any manner such that a portion of the body 212 is rearward of the first body load reaction component 224 and a portion is forward of the second body load reaction component 24. Separate components of the vehicle body can provide the forward and rearward portions.

When the downward force F is applied to the body 212 so that the bar 222 rotates in the direction of arrow R1 in FIG. 8, the extension portion 239 moves toward the rearward portion 264 of the body 212, thereby moving the first body load reaction component 24 to a compressed position in which the first body load reaction component 24 provides reaction force, such as by being compressed between the extension portion 239 and the portion 264 of the body 212. If the force F is removed and/or if both tire and wheel assemblies 18A, 18B move downward relative to the body 212, the body 212 will tend to "rebound", causing the bar 222 to rotate in the opposite direction R2 relative to the body 212. The extension portion 239 will be caused to move toward the portion 266 of the body 212 when the bar 222 rotates in the direction R2. This will cause the second body load reaction component 224 to provide a reaction force, such as by being compressed between the extension portion 239 and the forward portion 266 of the body 212. With the placement of the body load reaction components 24, 224 at a center portion 238 of the bar 222, the suspension apparatus 220 is also configured so that there is minimal or no reaction force of the body load reaction components 24, 224 during single wheel events or during vehicle lateral acceleration, as explained with respect to FIGS. 1-4. For example, if the body load reaction components 24, 224 are spring bumpers as in FIGS. 8 and 9, they are configured to be substantially free from contact with the bar 222 during single wheel events.

Alternatively, in any of the embodiments, the body load reaction component 24 or 224, and bar 22, 122, 122A, or 222 can be configured so that the orientation of the body load reaction component 24 can be varied manually, to provide static ride height control. For example, the body load reaction component 24 could be attachable to the bar 22, 122, or 222 at different mount positions to change the amount of rotation of the bar 22 or 122 required to compress the body load reaction component 24.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A suspension apparatus for a vehicle; wherein the vehicle has a body, a driver-side suspension corner assembly, and a passenger-side suspension corner assembly, the suspension apparatus comprising:

a bar having a first end operatively connectable to the driver-side suspension corner assembly and a second end operatively connectable to the passenger-side suspension corner assembly to extend therebetween, wherein the bar is rotatably mountable to the body between the suspension corner assemblies such that the bar is rotatable relative to the body from the first end to the second end; and a body load reaction component operatively connectable to at least one of the body and the bar for movement therewith; wherein the body load reaction component is engaged to provide reaction force on the body when the bar rotates sufficiently relative to the body, such that the body load reaction component manages vertical displacement of the body.

2. The suspension apparatus of claim 1, wherein the body load reaction component is a spring bumper; and wherein the bar is configured to rotate relative to the body when a sufficient downward force acts on the body to thereby cause the bar to compress the spring bumper between the body and the bar.

3. The suspension apparatus of claim 1, wherein the bar is configured to rotate relative to the body when both suspension corner assemblies move sufficiently upward relative to the body to thereby cause the body load reaction component to provide a reaction force on the body.

4. The suspension apparatus of claim 1, wherein each of the suspension corner assemblies has a corner jounce bumper; and wherein the bar and the body load reaction component are configured so that the body load reaction component is engaged with the bar prior to compression of the corner jounce bumpers when a sufficient downward force acts on the body.

5. The suspension apparatus of claim 4, wherein the bar and the body load reaction component are configured so that the body load reaction component is engaged with the bar prior to compression of the corner jounce bumpers under sufficient upward force on both suspension corner assemblies.

6. The suspension apparatus of claim 1, wherein the bar has a center portion; wherein the bar and the body load reaction component are configured so that the body load reaction component provides reaction force against the center portion when the bar rotates sufficiently relative to the body; and wherein the bar and the body load reaction component are configured so that the body load reaction component remains substantially free from loading when ends of the bar move in opposite directions.

7. The suspension apparatus of claim 1, wherein the bar is rotatably mountable to the body at first and second mount locations; and wherein the body load reaction component engages a portion of the bar that is laterally between the first and second mount locations.

8. The suspension apparatus of claim 7, wherein the body load reaction component is a spring bumper mountable to the body; wherein the bar has a nonlinear center portion between the mount locations; wherein the nonlinear center portion includes a straight portion between two bent portions; wherein the straight portion compresses the body load reaction component when the bar rotates, the nonlinear center portion of the bar thereby functioning as a lever to compress the body load reaction component when the bar rotates.

9. The suspension apparatus of claim 1, wherein the body load reaction component is mounted to the bar.

10. The suspension apparatus of claim 9, wherein the bar has a nonlinear center portion between the mounting locations; wherein the nonlinear center portion includes a straight portion and an extension portion extending from the straight portion; and wherein the body load reaction component is mounted on and engaged by the extension portion, the nonlinear center portion of the bar thereby functioning as a lever to engage the body load reaction component when the bar rotates.

11. The suspension apparatus of claim 1, wherein the body load reaction component is an actuator pivotably mounted to the bar and the vehicle body;
   a controller operatively connected to the actuator; and
   wherein the controller is configured to activate the actuator to provide reaction force of vehicle body loads thereby controlling movement of the bar relative to the vehicle body to actively control ride height.

12. The suspension apparatus of claim 1, wherein the body load reaction component is a first body load reaction component; and further comprising:
   a second body load reaction component operatively connectable to at least one of the body and the bar for movement therewith; wherein the bar is configured to engage the second body load reaction component when the bar rotates sufficiently relative to the body in a direction opposite to a direction of rotation of the bar that causes engagement of the first body load reaction component.

13. A suspension apparatus for a vehicle, wherein the vehicle has a body, a driver-side suspension corner assembly, and a passenger-side suspension corner assembly; the suspension apparatus comprising:
   a bar having a first end and a second end; wherein the bar is configured such that the first end is operatively connectable to the driver side suspension corner assembly and the second end is operatively connectable to the passenger side suspension corner assembly;
   wherein the bar is configured to be rotatably mountable to the body at first and second mount locations;
   wherein the bar has a center portion with a nonlinear shape that is between the first and second mount locations when the bar is connected to the suspension corner assemblies and rotatably mounted to the body;
   a body load reaction component operatively engageable with the center portion of the bar; wherein the body load reaction component engages between the center portion and the body when the bar rotates relative to the body, such that the body load reaction component resists further displacement of the bar relative to the body to thereby manage changes in vehicle ride height.

14. The suspension apparatus of claim 13, wherein the bar and the body load reaction component are configured so that the body load reaction component is not engaged when ends of the bar move in opposite directions.

15. The suspension apparatus of claim 13, wherein each of the corner suspension assemblies has a corner jounce bumper; and wherein the bar and the body load reaction component are configured so that the body load reaction component engages prior to compression of the corner jounce bumpers when the bar rotates relative to the body.

16. A vehicle comprising:
   a vehicle body;
   a suspension system including
   a driver-side suspension corner assembly;
   a passenger-side suspension corner assembly;
   a bar rotatably mounted to the body at mount locations between the driver-side suspension corner assembly and the passenger-side suspension corner assembly; wherein the bar has a first end and a second end, and is configured such that the first end is operatively connected to the driver-side suspension corner assembly and the second end is operatively connected to the passenger-side suspension corner assembly, the bar extends laterally from the driver-side suspension corner assembly to the passenger-side suspension corner assembly, and the bar is rotatable relative to the body from the first end to the second end; and
   a body load reaction component operatively connected to at least one of the body and the bar for movement therewith; wherein the body load reaction component is configured to be engaged between the bar and the body when the bar rotates relative to the body from a first position to a second position, such that the body load reaction component provides reaction force to manage vertical displacement of the body.

17. The vehicle of claim 16, wherein each of the suspension corner assemblies has a corner jounce bumper; wherein the corner jounce bumpers, the bar and the body load reaction component are configured so that the body load reaction component is engaged prior to compression of the corner jounce bumpers when a downward force on the vehicle body causes the bar to rotate from the first position to the second position;
   wherein the corner jounce bumpers are configured to compress after engagement of the body load reaction component when an upward force acts on both corner assemblies; and
   wherein the bar and the body load reaction component are configured so that the body load reaction component is not engaged when ends of the bar move in opposite directions.

18. The vehicle of claim 16, further comprising:
   an actuator operatively mounted to the body;
   a controller operatively connected to the actuator; and
   wherein the controller is configured to activate the actuator to move the body load reaction component relative to the bar to actively vary ride height.

19. The vehicle of claim 16, wherein the body load reaction component is mounted to the body; wherein the bar has a nonlinear center portion between the mount locations; and wherein the nonlinear center portion is configured to engage the body load reaction component when the bar rotates from the first position to the second position.

20. The vehicle of claim 16, wherein the body load reaction component is mounted to the bar; wherein the bar includes a straight portion between the mounting locations and an extension portion extending from the straight portion; and wherein the body load reaction component is mounted to the extension portion.

* * * * *